United States Patent [19]
Cathers et al.

[11] 4,200,420
[45] Apr. 29, 1980

[54] FRAME HAVING ROTATING ORIENTING MEMBERS

[75] Inventors: William P. Cathers, Allison Park; Charles W. Dorn, Jr., Pittsburgh, both of Pa.

[73] Assignee: PPG Industries, Inc., Pittsburgh, Pa.

[21] Appl. No.: 902,003

[22] Filed: May 1, 1978

[51] Int. Cl.² ............................................. B65G 61/00
[52] U.S. Cl. .................................... 414/107; 271/194; 294/65; 414/72; 414/786
[58] Field of Search ...................... 414/70, 71, 72, 104, 414/107, 786; 271/194, 195, 236, 238, 245; 294/65, 67 DA, 81 SF

[56] References Cited
U.S. PATENT DOCUMENTS

| | | | |
|---|---|---|---|
| 3,031,906 | 5/1962 | Holman | 198/422 X |
| 3,033,382 | 5/1962 | Noble et al. | 294/65 X |
| 3,151,904 | 10/1964 | Tantlinger et al. | 294/67 DA |
| 3,178,041 | 4/1965 | Wheat | 414/107 |
| 3,868,139 | 2/1975 | Drelicharz | 294/81 SF |
| 4,063,770 | 12/1977 | Guthrie | 294/81 SF |

Primary Examiner—L. J. Paperner
Attorney, Agent, or Firm—Donald Carl Lepiane

[57] ABSTRACT

A frame has (1) a pair of parallel arms normal to a third arm with each arm having a rotating L-shaped member for orienting a sheet and (2) a plurality of cups through which a vacuum is drawn to secure the oriented sheet to the frame and through which fluid is moved under pressure to bias the sheet away from the frame.

13 Claims, 5 Drawing Figures

FRAME HAVING ROTATING ORIENTING MEMBERS

BACKGROUND OF THE INVENTION

1. Field of the Invention

This invention relates to a sheet orienting and transporting frame.

2. Discussion of the Prior Art and Technical Problems

In the prior art, for example, in U.S. Pat. Nos. 1,959,216; 2,021,183; 2,049,850; 2,172,199; 2,899,088; 2,903,290; 3,033,381; 3,300,063; 3,476,632; 3,556,578; 3,610,673; 3,757,966; 3,848,752; 3,901,392; and 3,960,276; there are taught frames and/or handling apparatuses for transporting material, e.g., sheets and/or rods. In general, the frame includes vacuum cups for securing the sheet to the frame for subsequent transfer from a conveyor or stack to a stack or conveyor, respectively. The frames taught in the prior art are acceptable for their intended use; however, they do not have facilities for orienting the sheet prior to transporting same. Therefore, when a sheet is transferred from a conveyor to a stack, the sheet is normally oriented using additional equipment so that the stacked sheets are aligned.

U.S. patent application Ser. No. 901,944 filed even date in the name of W. P. Cathers for "Sheet Orienting and Transporting Frame" teaches a frame having slidable dogs mounted on elongated arms for orienting a sheet and vacuum cups for transporting the oriented sheet. Although the frame is ideally suitable for orienting and transporting sheets, there is a limitation. More particularly after the sheet is oriented, the dogs preferably disengage the sheet before they are withdrawn to a non-engaging position. If the dogs are moved to the non-engaging position while in contact with the oriented sheet, the oriented sheet may be misaligned and/or damaged.

It would be advantageous, therefore, to provide a frame capable of orienting and transporting sheet material that has orienting members movable to a non-engaging position while in contact with the oriented sheet.

SUMMARY OF THE INVENTION

This invention relates to a sheet orienting and transporting frame having a pair of longitudinal members mounted with their longitudinal axis normal to one another and lying in a plane. An arm is mounted on each of the longitudinal members for rotational movement away from the plane to an engaging position and toward the plane to a non-engaging position. Facilities mount the longitudinal members for securing the sheet to the frame.

This invention also relates to a method of orienting and transporting a sheet which includes the steps of advancing a sheet along an article movement path into a first position. A frame and the sheet are displaced relative to one another along a path transverse and at an oblique angle to the article movement path to orient the sheet by way of orienting means mounted on the frame. The oriented sheet is secured to the frame and the orienting means are rotated away from the sheet. The sheet is transferred from the first position to a second position by the frame after which the sheet is released.

DESCRIPTION OF THE INVENTION

Figure 1:
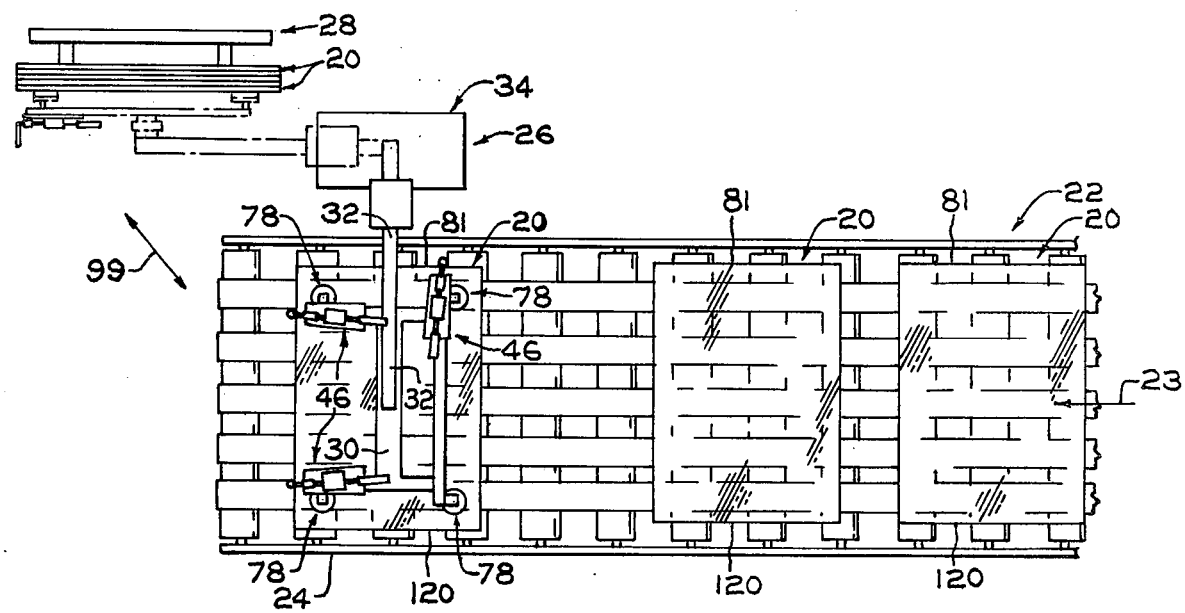
FIG. 1 is a top elevated view of a conveyor for moving sheets toward an unloading position where the sheets are oriented and transferred from the conveyor to a rack in accordance to the teachings of the invention.
Figure 2:
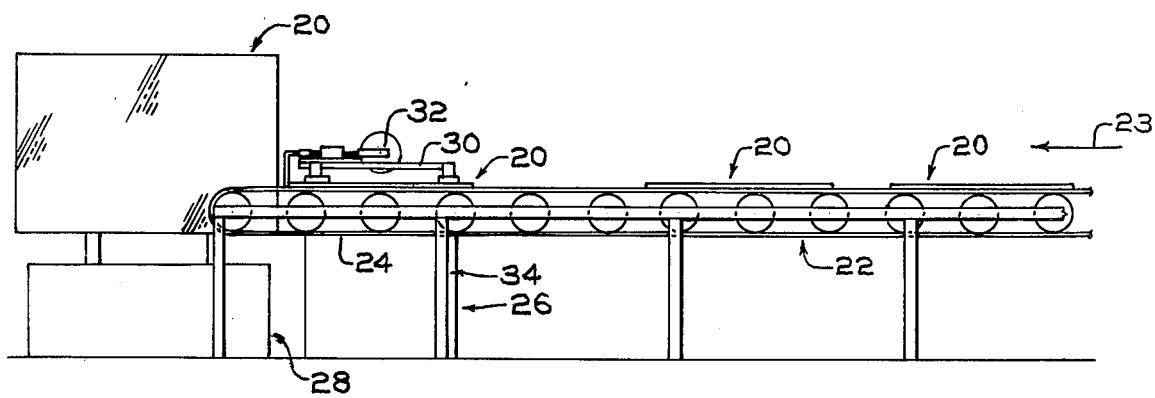
FIG. 2 is a side elevated view of the apparatus shown in FIG. 1.

With reference to FIGS. 1 and 2, sheets 20 are successively moved by belt conveyor 22 along an article movement path in the direction of arrow 23 into an unloading station 24. The sheet in the unloading station 24 is oriented and thereafter transported or transferred by apparatus 26 to rack 28 of the type used in the art. In the following discussion, the sheet acted on is a glass sheet; however, as will be appreciated, the invention is not limited thereto and may be practiced on other types of sheet material, e.g., wood, plastic, ceramic or metal sheets. The apparatus 26 includes a frame 30 incorporating features of the invention mounted on arm 32 of industrial robot 34 of the type known in the art. The industrial robot 34 is programmed to move and operate the frame 30 to orient and thereafter transfer the sheet 20 in a manner to be discussed below.

Figure 3:
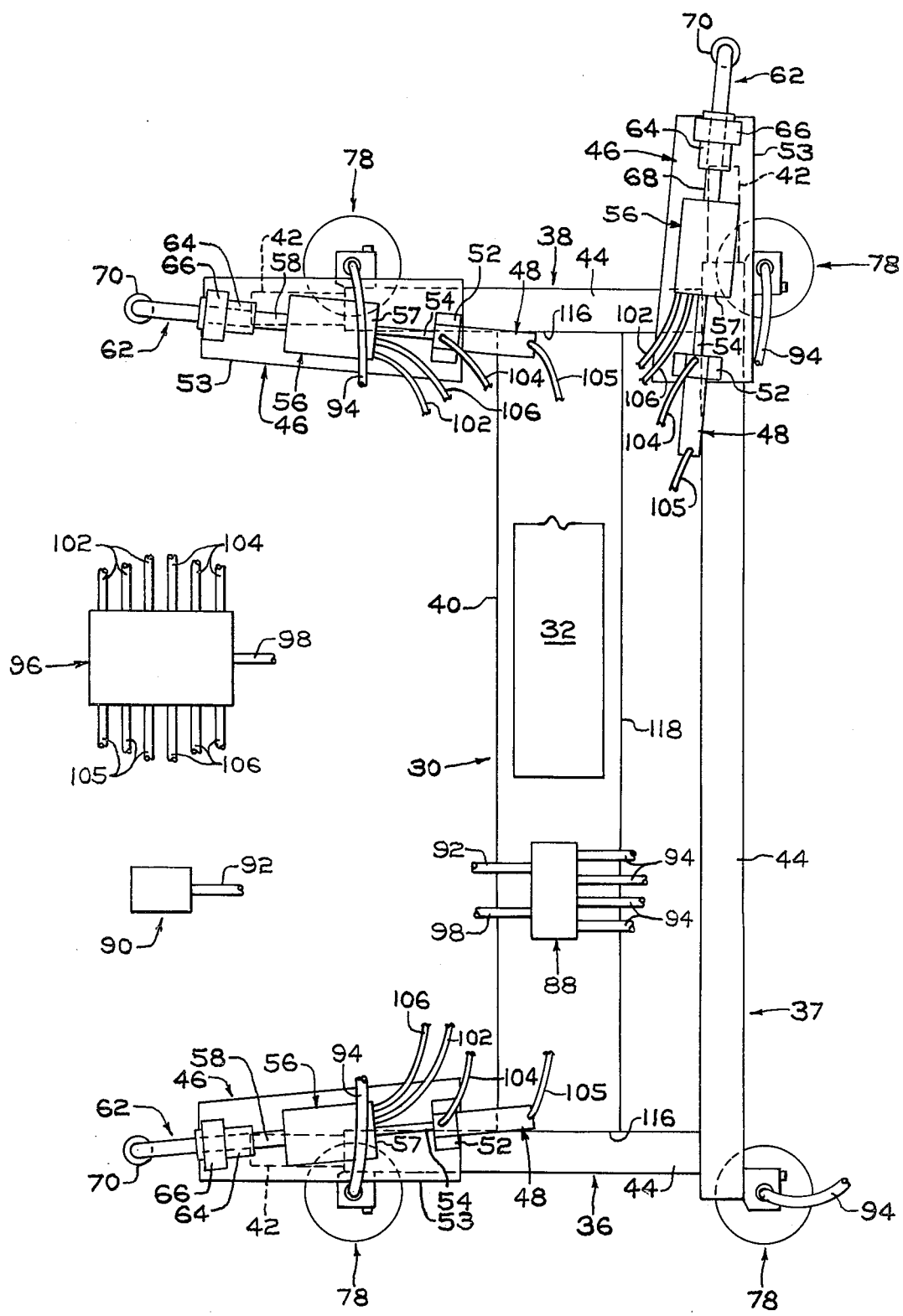
FIG. 3 is a top view of the orienting and transporting frame incorporating features of the invention.

As shown in FIG. 3, the frame 30 has a plurality of telescoping, orienting arms 36-38 mounted relative to one another by plate member 40 secured to the robot arm 32 in any conventional manner. The orienting arms 36-38 are identical in construction and each include an extending arm section 42, slidable in receiving arm section 44 (see also FIG. 5). The orienting arms 36 and 38 are mounted in spaced relation by the plate member 40 with their longitudinal axis parallel to one another. The arm section 44 of the orienting arm 38 is mounted on the receiving arm section 44 of the orienting arms 36 and 38 with its longitudinal axis perpendicular to normal to the longitudinal axis of the orienting arms 36 and 38 as shown in FIG. 3. In this manner, the orienting arms 36-38 oriented the sheet 20 in the unloading station 24 in x,y coordinance.

Figure 4:
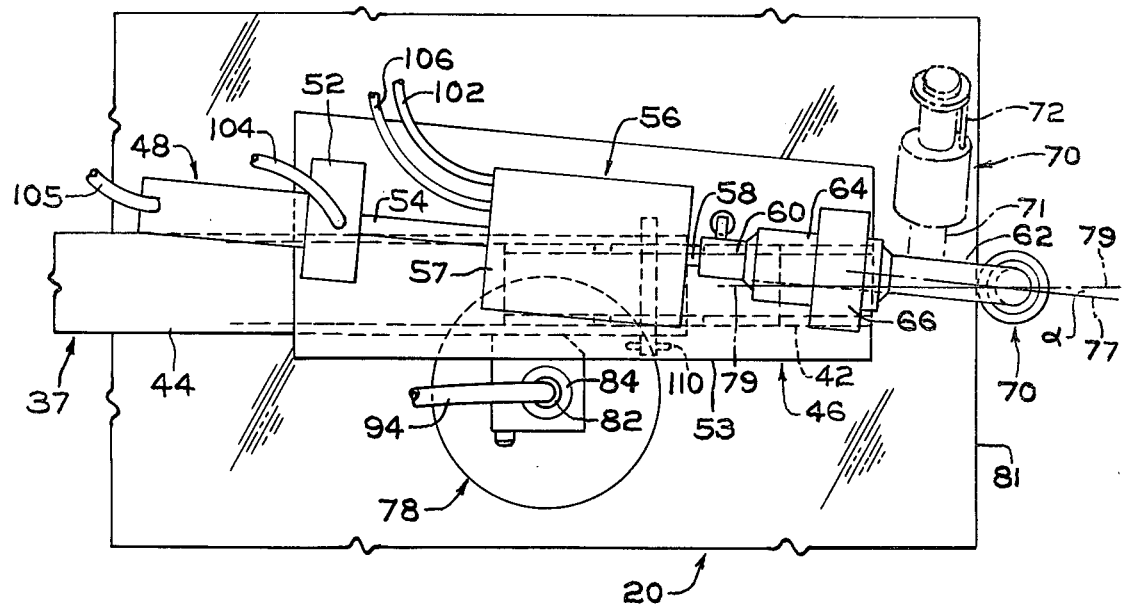
FIG. 4 is a view of the orienting device of the frame showing the engaging position of the orienting arm in solid lines and the non-engaging position of the orienting arm in phantom lines.
Figure 5:
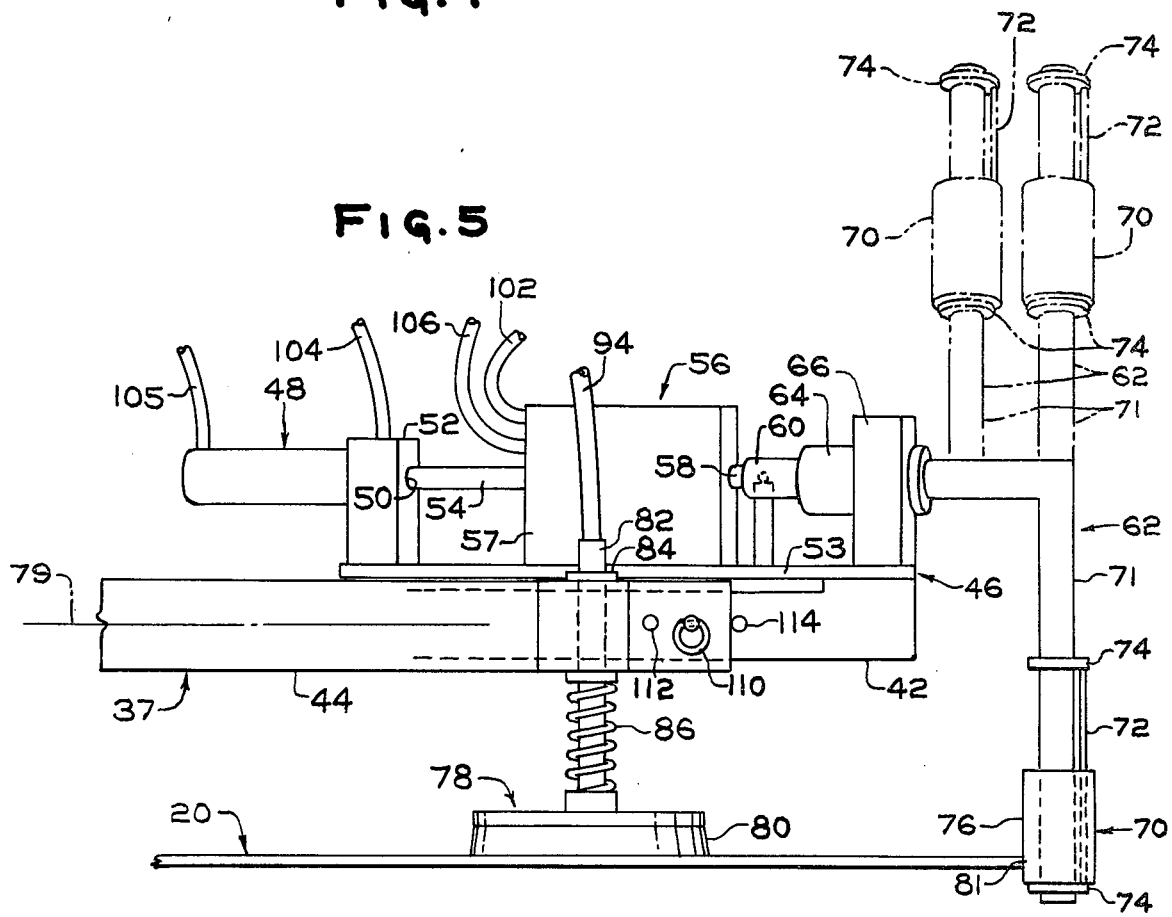
FIG. 5 is a side elevated view of the orienting device as shown in FIG. 4 illustrating in phantom lines the orienting arm in an intermediate position between the engaging position and non-engaging position.

With reference to FIGS. 3-5, a sheet engaging device 46 is mounted on the extending arm section 42 of the orienting arms 36-38. With specific reference to FIGS. 4 and 5, the device 46 includes a two-way cylinder 48 mounted in hole 50 of column 52 supported on plate member 53. Piston rod 54 of the cylinder 48 is connected to side 57 of rotating actuator 56 which has its shaft 58 mounted to leg 60 of L-shaped member 62 (shown clearly in FIGS. 4 and 5). The leg 60 of the L-shaped member 62 is slidably and rotatably mounted in bearing 64 captured in column 66 supported on the support member 53. With specific reference to FIGS. 4 and 5, a sleeve 70 is slidably mounted on the other leg 71 of the member 62 and secured against rotational motion in any conventional manner. For example, and as clearly shown in FIG. 5, the sleeve 70 is slidably mounted on a rod 72 having its ends captured in spaced collars 74 secured to the leg 68. In this manner, when the contacting surface 76 of the sleeve 70 has excessive wear, the worn sleeve portion may be moved by relocating the collar 74 on the rod 72. The contacting surface 76 is preferably non-abrading to prevent edge damage to the sheet 20 during orientation.

With specific reference to FIG. 4, the plate member 53 is mounted such that the rotating axis 77 of the L-shaped member 62 and longitudinal axis 79 of its respective orienting arm subtend an oblique angle α greater than 0° and preferably about 5°. In this manner, as the leg 71 of the L-shaped member 62 is rotated by the rotating actuator 56 from the engaging position as shown in solid lines in FIG. 5 to an intermediate non-engaging position as shown by extreme right phantom lines in FIG. 5, the sleeve 70 moves away from the sheet edge 81 without moving the sheet. The leg 71 of the L-shaped member 62 is moved to the non-engaging position as shown by the extreme left phantom lines in FIG. 5 by the piston 54.

Engaging devices 78 mounted on receiving arm section 44 of the orienting arms 36–38 (see FIG. 3) each have a suction cup 80 mounted on a hollow rod 82 (see FIG. 5). The hollow rod 82 is captured for slidable movement in bushing 84 mounted in any conventional manner on the orienting arms 36–38. The cup 80 is biased away from its respective arm 36–38 by spring 86 mounted on the rod 82 between the bushing 84 and cup 80. Referring to FIG. 3, a four-way valve 88 of the type used in the art is mounted on the plate member 40 and connected to a vacuum source 90 by line 92 to pull a vacuum through cups 80 by way of line 94 and hollow rod 82 to secure the sheet 20 to the frame 30. The valve 88 is connected to a pressurized fluid supply 96 through line 98 to move a fluid, e.g., air, under pressure through the cups 80 by way of the line 94 and hollow rod 82 to move or bias the sheet away from the frame 30.

In practice and with reference to FIG. 1, the sheets 20 are displaced along the conveyor 22 toward the unloading station 24 as the frame 30 is moved toward the unloading station with the leg 71 of the L-shaped member 62 in the engaging position. After a sheet has moved into the unloading station 24, the conveyor is stopped as the arm 32 of the robot 34 continues to move along the path designated by the arrow 99 in FIG. 1 toward the sheet 20 in the unloading station 24. The path designated by the arrow 99 is a reciprocating linear path at an oblique angle to the sheet movement path 23. The frame 30 moves in a first direction along the reciprocating path 99 to engage the edges of the sheet in the unloading station 24 to orient same in an x,y orientation. After the frame has moved a predetermined distance along the path 99 to assure that the sheet is oriented, the valve 88 (shown in FIG. 3) connects the engaging devices 78 to the vacuum supply 90. The frame 30 moves downward as viewed in FIG. 5 toward the oriented sheet 20 as (1) the cups 80 are biased toward the sheet by the spring 86 and (2) the sleeve 70 slides upwardly as viewed in FIG. 5 on the leg 71 and rod 72.

When the sheet is secured to the frame 30 by the cups 80, air is moved from air supply 96 through lines 102 to the rotating actuators 56 to rotate the member 62 from the engaging position to the intermediate non-engaging position as shown in FIG. 5. Thereafter air from the supply 96 is moved through lines 104 to the cylinders 48 to move the pistons 54 into their respective cylinder 48 as the rotating actuators 56 move to the left as shown in FIG. 5 to move the L-shaped member 62 into the nonengaging position. The L-shaped member may be moved from the engaging position while the sheet is in the loading station or while the sheet is moving from the loading station toward the rack 28. After the frame 30 has cleared the conveyor 22, the frame is rotated 90° and the sheet is loaded on the rack 28. When the sheet is in position, the valve 88 is acted on to pass pressurized air from supply 96 through the line 98 and through the cups 80 to urge the sheet against the previously stacked sheets. The robot arm 32 moves toward the unloading station 24 as the L-shaped member 62 is moved to the intermediate non-engaging position by moving air through lines 105 to the air cylinders 48 to move the piston 54 out of the cylinder which moves the rotating actuator 56 to the right as viewed in FIG. 5. Air from the supply 96 is moved through lines 106 to the rotating actuators 56 to move the member 62 from the intermediate non-engaging position to the engaging position. As can be appreciated, when the frame has no sheet secured thereto, the rotating actuators 56 may be energized before the cylinders 48 or simultaneously therewith. Further, as the frame 30 moves toward the unloading station 24, the valve 88 may disconnect the cup 80 from the vacuum source 90 and pressurized air supply 96. The frame 30 is now readied to orient the next sheet moved into the unloading station 28 as the previous sheet was being acted on. As the arm 32 of the robot 34 moves away from the rack, the rack is preferably indexed in any conventional manner so that a position for the next sheet is provided.

Using the frame of the instant invention, the aligning devices when in the non-engaging position are spaced inwardly from the edges of the sheets. In this manner, the sheet may be stacked on racks or in prefabricated cases where the clearance between the edges of the stacked sheets and the inside surface of the box is minimal. As can be appreciated, the orienting arms are preferably telescoped so that the orientation of the sheet can be accomplished and the frame after orientation is approximately in the center of the sheet so that the weight of the engaged sheet is equally distributed to each cup thereby minimizing bending moments. Further, as can be appreciated, the frame (1) may be used with only two orienting arms having their longitudinal axis normal to one another and (2) may be used with sleeve 70 (see FIG. 5) having a rectangular cross section as well as a circular cross section. Further modifications may be made to the frame 30 without deviating from the scope of the instant invention.

DETAILED DESCRIPTION OF THE INVENTION

The frame 30 of the instant invention is used with an industrial robot 34 sold by Cincinnati Milacron of Cincinnati, Ohio, Model 6CH, to orient and transfer glass sheets 20 from belt conveyor 22 to rack 28 of the type used in the art.

With reference to FIG. 3, receiving arm sections 44 of the orienting arms 36–38 are made of 11 gauge 2 inch (5.08 centimeters) square steel tubing, and the extending arm sections 42 of the arms 36–38 are made of 11 gauge 1.75 inch (4.45 centimeters) square steel tubing. The extending arm sections and receiving arm sections are adjusted in length by pin 110 passing through aligned holes 112 and 114 of the receiving arm section 44 and extending arm section 42, respectively (shown in FIG. 5).

With reference to FIG. 3, the receiving arm section 44 of orienting arms 36 and 38 are mounted on a center-to-center spacing of 40 inches (21.6 centimeters) on opposed sides 116 of plate member 40 made of 6 inch (15.24 centimeters) aluminum channel at 3.62 pounds (1.65 kilograms) having a length of about 42 inches (106.68 centimeters). The length of the receiving arm section 44 of the orienting arms 36 and 38 is about 17½ inches (43.5 centimeters) and extends about 4 inches (10.16 centimeters) beyond side 118 of the plate member. The receiving arm section 44 of the orienting arm 37 having a length of about 45 inches (114.3 centimeters) is supported on the receiving arm section 44 of the orienting arms 36 and 38 as shown in FIG. 3 on a center-to-center spacing of about 8 inches (20.32 centimeters) with the plate member 40. The orienting arm 38 has its longitudinal axis normal to the longitudinal axis of the orienting arms 36 and 38. The extending arm section 42 of the orienting arms 36–37 each have a length of 15¼ inches (38.74 centimeters).

Referring to FIGS. 4 and 5, an aluminum support plate ¼ inch (0.64 centimeter) thick, 3½ inches (8.89 centimeters) wide and 10⅝ inches (26.99 centimeters) in length is mounted on each of the extending arm sections for supporting sheet engaging device 46. The sheet engaging device includes a two-way cylinder 48 of the type sold by Bimba Company, Model 090-D, 2 inch (5.08 centimeters) stroke, mounted in hole 50 of column 52. The column 52 is 4 inches (10.16 centimeters) high and mounted on the plate member 53. Rod 54 of the cylinder 48 is connected to rotary actuator 56 of the type sold by Rotac Company of Greenville, Ohio, Model No. S250-IV. Shaft 58 of the actuator 56 is mounted to leg 60 of L-shaped member 62. Leg 60 of the L-shaped member made of ⅞ inch (2.22 centimeters) diameter steel rod having a length of about 6¾ inches (17.145 centimeters) is rotatably and slidably mounted in a Rotolin Bearing, Catalogue No. MLF 875-1500-2 with a 0.875 inch (2.22 centimeters) shaft. The bearing 64 is mounted in column 66 supported on the plate member 53. Leg 71 of the L-shaped member 62 is made of steel rod about 9 inch (22.86 centimeters) long and ¾ inch (1.90 centimeters) in diameter. A Rotolin Bearing 70, Catalogue No. ML 750-1250-2 with 0.75 inch (1.91 centimeters) shaft is slidably mounted on the leg 71 and captured thereon by a rod 72 passing through the bearing 70 and having its ends secured to collar 74 spaced about 3½ inches (8.9 centimeters) apart. A 3/16 inch (0.48 centimeter) thick and 2½ inch (6.35 centimeters) high sheet 76 of a synthetic resin polymer sold under the trademark TEFLON ® is mounted on the bearing to prevent damage to the engaged glass edge portions. The plate 53 of the orienting devices is mounted on the extending arm sections such that the rotating axis 77 of the member 62 and the longitudinal axis 79 of its respective orienting arm subtend an angle of about 5° (see FIG. 4).

With reference to FIG. 3, a pair of engaging devices 78 on a center-to-center spacing of 44 inches (111.76 centimeters) are mounted on arm section 44 of the orienting arm 37; an engaging device 78 is mounted on each of the arm sections 44 of the orienting arms 36 and 38 on a center-to-center spacing of 20 inches (50.8 centimeters) with adjacent device on orienting arm 37. Referring now to FIG. 5, each device 78 has a 6 inch (15.24 centimeters) long hollow rod 82 having an outside diameter of ⅝ inch (1.59 centimeters) and a wall thickness of about 5/32 inch (0.40 centimeter) captured for slidable movement in ball bushing 84. A 4 inch (10.16 centimeters) diameter suction cup 80 of the type used in the art is mounted on the end of the hollow rod and biased away from its respective arm by spring 86 as shown in FIG. 5. With specific reference to FIG. 3, a four-way valve 88 of the type sold by Numatics, Incorporated of Highland, Mich., mounted on the plate member 40 is connected by way of line 92 to a vacuum source 90; by way of line 98 to a pressurized air supply 96 and by way of lines 94 to each of the hollow rods 82 of the engaging devices 78.

Where feasible, parts of the frame 30, e.g., the plate member 40, are lightened by either using hollow parts or drilling holes in the parts. Further, the plate member 53 of the orienting devices is sized to clear adjacent engaging devices 78 when the extending arm section 42 is moved into the receiving arm section 44.

Referring now to FIG. 1, sheets 22 having a length of about 76 inches (1.93 meters) as measured between sides 81 and 120 (see FIG. 1) and a width of 46 inches (86.36 centimeters) and a thickness of about 7/32 inch (0.56 centimeter) are moved along the belt conveyor 22 into the unloading station 24. The orienting arms 36 and 37 of the frame are adjusted to have a length of about 23 inches (58.42 centimeters) as measured between the sleeve 76 with the member 62 in the engaging position and center line of the plate member 40. The orienting arm 38 has a length of about 38 inches (0.97 meter) measured between the sleeve 76 with the arm 62 in the engaging position and center line of the plate member 40.

After a sheet has moved into the unloading position 24, the arm 32 of the robot 34 moves the frame 30 toward the sheet with the orienting devices in the engaging position. The frame moves toward the sheet along the path 99 which path 99 and the sheet movement path 23 subtend a 45° angle (see FIG. 1). Continual movement of the frame 30 into the unloading station moves the sleeve 70 of the orienting devices into engagement with peripheral edge portions of the sheet to orient same. After the sheet is oriented, the frame is moved toward the sheet to move the cup 80 to the engaging devices against the sheet. Vacuum is pulled through the cups by the source 90, through the lines 92, the valve 88 and lines 94. As the frame 30 moves toward the sheet, the sleeve 70 of the orienting devices moves up the leg 71 of the member 62. As the frame having the sheet secured thereto is moved away from the unloading station, air from supply 96 is moved to the rotary actuators 56 through lines 102 to rotate the L-shaped member 62 from the engaging position to the intermediate non-engaging position. Air is moved through lines 104 to the cylinders 48 to withdraw the piston into the cylinder to move the arm 62 from the intermediate non-enaging position to the non-engaging position to a position spaced inwardly from the glass edge. As the sheet clears the conveyor, the arm is rotated 90° and the sheet is mounted on a rack 28. The four-way valve 88 is acted on to shut off vacuum through lines 94 and move pressurized air from supply 96 through the cups 80 by way of lines 98 and 94 to urge the sheet against the rack or previously stacked sheets. As the sheet is being loaded, the conveyor 22 is energized to move the next sheet into the unloading position. As the frame is moved toward the unloading station, air is moved from supply 96 to the cylinder 48 through line 105 to move the member 62 from the non-engaging position to the intermediate non-engaging position, and air is moved from the supply 96 to the rotary actuator 56 by way of line 106 to move the member 68 from the intermediate non-engaging position to the engaging position. The valve 88 disconnects the pressurized air supply 96 from the engaging device to complete one loading cycle. The loading cycle is repeated for transferring each sheet in the unloading station 24 to the rack 28.

As can be appreciated, the above example is merely illustrative of the invention and is not limited thereto.

What is claimed is:

1. A sheet orienting and transporting frame comprising:
    structural means containing a pair of longitudinal axis transverse to one another;
    a pair of arms each having an engaging surface and a rotating axis;
    means for rotatably mounting said pair of arms in relationship to said longitudinal axes with the rotating axis of each of said arms and its respective longitudinal axis subtending an oblique angle;
    means for rotating said arms to move said engaging surface into a first predetermined position defined as a sheet engaging position and outward of and away from the sheet engaging position toward a second predetermined position defined as a non-engaging position; and
    sheet transporting means mounted in relationship to said structural means.

2. The frame as set forth in claim 1 further including:
    means for moving said arms along a linear path into the second predetermined position.

3. The frame as set forth in claim 1 wherein said sheet transporting means includes:
    resilient cups; and
    means for pulling a vacuum through said cups.

4. The frame as set forth in claim 3 further including:
    means for moving fluid under pressure through said cups.

5. The frame as set forth in claim 1 wherein said structural means includes:
    a first longitudinal member having a longitudinal axis;
    a second longitudinal member in the plane of said pair of longitudinal members with having a longitudinal axis normal to the longitudinal axis of said first member wherein the longitudinal axis of said first and second member are said pair of longitudinal axis; and further including:
    a third longitudinal member having longitudinal axis parallel to the longitudinal axis of said first member;
    a third arm having an engaging surface and a rotating axis;
    said rotatably mounting means further includes means for mounting third arm in relationship to the longitudinal axis of said third member with the rotating axis of said third arm and the longitudinal axis of said third member subtending an oblique angle and
    said rotating means further includes means for rotating said third arm to move the engaging surface of said third arm into the sheet engaging position and toward the non-engaging position.

6. The frame as set forth in claim 5 wherein said longitudinal members are telescoping members.

7. The frame as set forth in claim 5 wherein each of said arms is an L-shaped member having a first leg containing the rotating axis and a second leg having the engaging surface and further including:
    means for moving said arms along a linear path into and out of the second predetermined position.

8. The frame as set forth in claim 5 wherein said sheet transporting means includes a resilient cup; means for pulling a vacuum through said cup and means for moving a fluid under pressure through said cup.

9. The frame as set forth in claim 7 wherein said engaging surface of each of said arms includes a sleeve slidably mounted on the second leg of said L-shaped member, said sleeve having a low abrading surface.

10. A method of orienting and transporting a sheet, comprising the steps of:
    advancing a sheet along a sheet movement path into a first position;
    positioning structural means in spaced relation to the sheet, the structural means having a pair of longitudinal axis transverse to one another and a rotating arm having an engaging surface associated with each longitudinal axis with rotating axis of the rotating arms and its respective longitudinal axis subtending an oblique angle greater than 0°;
    rotating the arms toward the sheets to move the engaging surface of the arms into contact with the sheet;
    displacing the sheet and structural means relative to one another to orient the sheet;
    rotating the arms to move the engaging surface of the arms outwardly of and away from the oriented sheet;
    engaging the oriented sheet; and
    moving the oriented sheet from the first position to a second position.

11. A method of orienting and transporting a sheet, comprising the steps of:
    advancing a sheet along a sheet movement path into a first position;
    positioning structural means in spaced relation to the sheet, the structural means having a pair of longitudinal axes transverse to one another and a rotating arm having an engaging surface associated with each longitudinal axis with rotating axis of the rotating arms and its respective longitudinal axis subtending an oblique angle;
    rotating the arms toward the sheets to move the engaging surface of the arms into contact with the sheet;
    displacing the sheet and structural means relative to one another to orient the sheet;
    engaging the oriented sheet;
    rotating the arms to move the engaging surface of the arms outwardly of and away from the oriented sheet; and
    moving the oriented sheet from the first position to a second position.

12. The method as set forth in claim 11 further including the step of releasing the sheet.

13. The method as set forth in claim 11 wherein said displacing step is accomplished by moving the frame along a path transverse and at an oblique angle to the movement path.

* * * * *